United States Patent [19]

Ramsden

[11] 3,856,867

[45] Dec. 24, 1974

[54] PROCESS FOR THE PREPARATION OF GRIGNARD REAGENTS AND THEIR UTILIZATION IN ORGANIC SYNTHESES

[75] Inventor: Hugh E. Ramsden, Scotch Plains, N.J.

[73] Assignee: Rhodia, Inc., New York, N.Y.

[22] Filed: Mar. 6, 1972

[21] Appl. No.: 232,257

[52] U.S. Cl............. 260/665 G, 260/469, 260/478, 260/484 R, 260/590, 260/593 R, 260/597 R, 260/599, 260/601 R, 260/604 R, 260/618 R, 260/632 R, 260/666 A, 260/668 R, 260/676 R, 260/680 R
[51] Int. Cl............................................... C07f 3/02
[58] Field of Search.................... 260/665 R, 665 G

[56] References Cited
UNITED STATES PATENTS

| 3,161,689 | 12/1964 | Cooper et al. | 260/665 A |
|---|---|---|---|
| 3,168,582 | 2/1965 | Aufdermarsh | 260/665 G |
| 3,388,179 | 6/1968 | Ramsden | 260/665 G |
| 3,597,488 | 8/1971 | Shepherd | 260/665 G |
| 3,711,560 | 1/1973 | Ramsden | 260/665 G |

OTHER PUBLICATIONS

Coates et al., Principles of Organometallic Chemistry, 1968, Methuon and Co., London, p. 20–21.

*Primary Examiner*—Daniel E. Wyman
*Assistant Examiner*—A. P. Demers

[57] ABSTRACT

A process is provided for the preparation of mono or polyunsaturated Grignard reagents which are useful in organic syntheses and particularly for the preparation of complex terpenic alcohols, such as lavandulol. A conjugated diene, an alkyl or allyl halide, and magnesium are reacted in the presence of a cyclic ether to form the Grignard reagent. To form a terpenic alcohol such as lavandulol, a diene such as isoprene and a diene hydrohalide such as prenyl halide are reacted with magnesium, and the Grignard reagent is then treated with oxygen and hydrolyzed, to form, for example, lavandulol.

12 Claims, No Drawings

PROCESS FOR THE PREPARATION OF GRIGNARD REAGENTS AND THEIR UTILIZATION IN ORGANIC SYNTHESES

The organomagnesium halides known as Grignard reagents of the type RMgX are classically prepared by the reaction of the corresponding halide RX with magnesium in an anhydrous organic solvent such as ethyl ether. The very reactive Grignard reagent in turn can be reacted with a variety of reagents to introduce the R substituent into ketones, alcohols, aldehydes, esters, and other organic compounds. Alcohols are formed by insertion of oxygen in the Grignard reagent, resulting in an oxymagnesium halide, which upon hydrolysis yields the corresponding alcohol ROH. This reaction is, however, of little commercial importance, since the alcohol ROH is usually the starting material for the halide RX. On the other hand, when the halide is available, and the alcohol not, the halide can be converted directly to the alcohol and there is no need to proceed by way of the Grignard reagent, which is a more expensive route than other available methods. Therefore, this method is of little practical value.

It has recently been reported (*Chemical and Engineering News*, Apr. 17, 1967, pp. 46–47, U.S. Pat. Nos. 3,388,179, patented June 11, 1968, and No. 3,642,845, patented Feb. 15, 1972, to Hugh E. Ramsden), that conjugated dienes react with magnesium compounds. Two diene units become linked together, and form a cyclic organomagnesium diene compound which can be hydrolyzed with water to form a diene dimer. The magnesium can be coupled to the dienes at any carbon of the ethylenic double bonds, and since there are four such possible positions on each of two diene units, a large number of isomers can be obtained. In fact, Ramsden reported a mixture containing about 20 isomers, of which the double bond isomers of tail-to-tail products predominate. Not all conjugated dienes react in this way. For instance, 1,3-pentadiene does not react, for reasons which Ramsden could not explain.

Although Ramsden refers to these products as Grignard reagents, in fact they are not true Grignard reagents, because they contain no halide, and because the magnesium is bivalently linked to the hydrocarbon group, instead of monovalently, as in RMgX. They are true organomagnesium compounds, and undergo the reactions of such compounds, which are different from the reactions of the true Grignard reagents, as these references show.

Tatsuo, et al., Japanese Pat. No. 3370/1971, published Jan. 29, 1971, describe another method for preparing organomagnesium compounds, starting with conjugated dienes, and using a Lewis acid as a catalyst. In this method, also, the conjugated diene compound becomes bonded bivalently with metallic magnesium, apparently in a manner similar to that described by Ramsden, in the presence of the Lewis acid catalyst. The inventors indicate that the resulting organomagnesium compound has a reactivity similar to that of a Grignard reagent and can be used in various reactions. It does not appear to contain halide in the molecule, since the reagents used in its preparation need not contain halogen.

In accordance with the instant invention, it has been discovered that a conjugated diene and an alkyl or allyl halide react together with magnesium to produce a complex Grignard reagent RMgX which contains halide X in the molecule, and undergoes conventional Grignard reactions. Thus, by oxygenation and hydrolysis, the Grignard compound can be converted to the corresponding alcohol.

For instance, an allyl halide

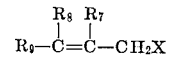

reacts to add an allyl group to a carbon of one of the double bonds of the conjugated diene. Thus, it can add to any of four positions in the diene. The halide adds to magnesium, which becomes bonded to the other carbon of that ethylenic double bond, in a normal 1,2-addition, or possibly to a carbon of the other ethylenic double bond of the diene, by 1,4-addition. The result is a complex group of isomers.

To illustrate the reaction, for simplicity designating the halide RX, the reaction scheme and various products can be described as follows:

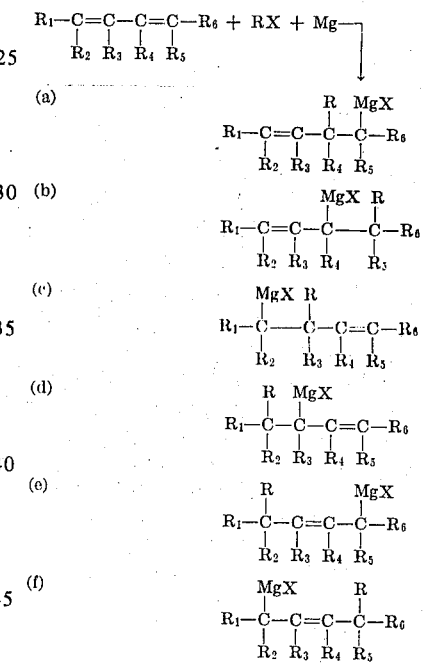

In the above formulae, $R_1$, $R_2$, $R_3$, $R_4$, $R_5$, $R_6$, $R_7$, $R_8$, and $R_9$ are hydrocarbon groups, or hydrogen. The hydrocarbon groups can have from one to about 50 carbon atoms, and can be straight chain or branched. They can be saturated or unsaturated, and alicyclic or cyclic in structure. Exemplary hydrocarbon groups are alkyl, alkenyl, aryl, cycloalkyl and cycloalkenyl, alkylaryl, arylalkyl, cycloalkylalkyl and alkylcycloalkyl groups.

Exemplary hydrocarbon groups include methyl, ethyl, propyl, isopropyl, butyl, isobutyl, secondary butyl, tertiary butyl, amyl, isoamyl, secondary amyl, tertiary amyl, hexyl, isohexyl, 2-ethylhexyl, secondary hexyl, tertiary hexyl, heptyl, isoheptyl, octyl, nonyl, decyl, myristyl, stearyl, allyl, butenyl, pentenyl, hexenyl, heptenyl, octenyl, nonenyl, oleyl, ricinoleyl, linooleyl, cyclohexyl, cyclobutyl, cyclopentyl, cyclopropyl, cycloheptyl, cyclooctyl, cyclododecyl, cyclopentenyl, cyclohexenyl, cycloheptenyl, phenyl, benzyl, xylyl, ethylphenyl, methylphenyl, octyphenyl, dodecylphenyl, naphthyl, anthracyl, phenethyl, phenpropyl, and phenbutyl.

The halide X can be chlorine, bromine, or iodine. The chloride is preferred; the bromide is more reactive, but also more expensive; the iodide is more difficult to work with, and can be used in admixture with a chloride or bromide.

The Grignard reagents obtained in accordance with this reaction are novel compounds, and undergo the conventional reactions of Grignard reagents. They will, for example, react with ketones, aldehydes, esters, acid anhydrides, dialkyl formamides, cyanides, $CO_2$, and alkylene oxides in Grignard reactions to add substitutents in the molecule. Oxidations of the Griguard reagent with oxygen followed by hydrolysis results in the corresponding alcohol. Consequently, these Grignard reagents afford a route to diene aldehydes, ketones, esters, γ-keto acids, hydrocarbons, and alcohols of quite complex structure, which would otherwise be difficult of access.

Exemplary is the reaction with oxygen followed by hydrolysis to form the alcohol:

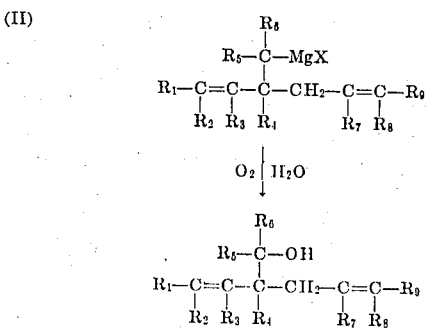

The reaction proceeds with any conjugated diene. The simplest conjugated diene is butadiene. Other conjugated dienes which can be used include 1,1-dimethyl butadiene; 2,3-dimethyl butadiene; isoprene; pentadiene-1,3; hexadiene-1,3; 2,3-dimethyl hexadiene-1,3; heptadiene-1,3; octadiene-1,3; 2-methyl-6-methylene-octadiene-2,7; nonadiene-1,3; decadiene-1,3; undecadiene-1,3; myrcene; 2,6-dimethyl nonatriene-2,6,8; hexatriene-1,3,5; heptatriene-1,3,5-; octatriene-1,3,5; nonatriene-1,3,5; decatriene-1,3,5; and undecatriene-1,3,5.

The process of the invention is applicable to any allyl halide, such as allyl chloride, allyl bromide, allyl iodide, methallyl bromide, methallyl chloride, methallyl iodide, crotyl chloride, crotyl bromide, crotyl iodide, 2,3-dimethyl allyl chloride, 2,3-dimethyl allyl bromide, 2,3-dimethyl allyl iodide, 3,3-diethyl allyl chloride, 3,3-diethyl allyl bromide, 3,3-diethyl allyl iodide, isoprene hydrochloride, isoprene hydrobromide, isoprene hydroiodide, butadiene hydrochloride, butadiene hydrobromide, butadiene hydroiodide, 3-butyl-allyl chloride, 3-butylallyl bromide, 3-phenyl-allyl chloride, 3-phenyl-allyl bromide, 3-cyclohexyl-allyl chloride, 3-cyclohexyl-allyl bromide, 3-cyclopentyl-allyl chloride, 3-cyclopentyl-allyl bromide, and 3-stearylallyl chloride.

The process however is not restricted to allyl halides since it is operable with almost any primary alkyl halide which does not contain reactive substituents. In general, the primary halide can be described as $ZCH_2X$ where Z can be hydrogen or any alkyl, alkenyl, polyalkenyl, cycloalkyl or cycloalkenyl as well as aromatic hydrocarbon group which can be branched or substituted with anything but substituents which would react in the conditions of the reaction. Groups representative include methyl, ethyl, propyl, isopropyl, n-butyl, iso-butyl, t-butyl, butenyl, propenyl, amyl, pentenyl cyclopentenyl and cyclohexyl cyclohexenyl methoxy ethyl, methoxyl, methyl acetylenyl, octyl, nonyl, lauryl, stearyl, benzyl, phenyl, alkyl benzyl, alkyl phenyl, o-, m-, or p-alkyl, alkoxyl, allyl phenyl or benzyl etc.

The magnesium metal can be used in any form, but it is preferably finely divided, such as magnesium turnings, magnesium beads, and magnesium powder. Magnesium sheet and ribbon can also be used. The magnesium can be activated prior to reaction by treating with an alkyl bromide or iodide, such as ethyl bromide or iodide, at a temperature from about 5°C to about 200°C, in the organic ether in which the reaction is to be carried out.

The reaction proceeds in the presence of the organic aliphatic or cyclic ether as a reaction solvent. Tetrahydrofuran is preferred, but other cyclic ethers can be used, including dioxane, 2-methyltetrahydrofuran, and 2,3-dimethyltetrahydrofuran. Also useful are the polyoxyalkylene glycol ethers, such as diethyl ether of ethylene glycol, dimethyl ether of ethylene glycol, diethyl ether of diethylene glycol, diethyl ether of triethylene glycol, and dipropyl ether of propylene glycol.

The process of the invention is of particular interest for the preparation of lavandulol, 2,6-dimethyl-5-oxymethylheptadiene-2,6, which can be obtained by reaction of isoprene, prenyl chloride and magnesium, to form the Grignard reagent, followed by oxidation and hydrolysis of the Grignard reagent to form lavandulol, in accordance with the following scheme:

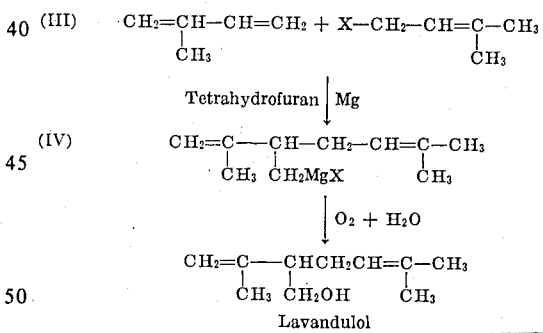

Lavandulol was isolated by Schinz and co-workers from lavandula vera oil. The procedure used is described by Schinz in *The Perfumery and Essential Oil Record* 37 167–169 (July, 1946) summarizing the previous technical papers: Schinz and Seidel, *Helv.* 25 1572 (1942); Schinz and Bourquin, *Helv.* 25 1591 (1942); Seidel, Schinz and Muller, *Helv.* 27 664 (1944); Schinz and Muller, *Helv.* 27 57 (1944); Schinz and Simon, *Helv.* 28 774 (1945); further Diss. Bourquin E.T.H. Zurich, as well as Diss. Simon E.T.H. (1946). The alcohol prepared by Ruzicka and Roethlisberger, *Helv.* 18 439 (1935) is the racemic form of lavandulol, admixed with other isomers.

Lavandulol is quite interesting terpenic alcohol which until now has been difficult of access, and consequently quite expensive, much more expensive than geraniol, to which it is similar, but in many respects more desirable for use in perfumery. Lavandulol is more stable than geraniol. The smell of the free alcohol is similar to that of geraniol, only somewhat more herby. Its acetate has a strong and strikingly fresh smell, and in this respect is markedly different from geranyl acetate. Lavandulyl methyl butyrate has a herbaceous tea-like, clary, sage-like odor, which is very tenacious, and is therefore useful in artificial oils and new types of fragrances. Lavandulol itself can be used in artificial bergamot and lavender oils, and in synthetic forms of various essential oils.

The syntheses used by Schinz and co-workers in preparing lavandulol are not suitable for low-cost large-scale production. In one case, lavandulol is made from isoprene hydrobromide and sodium isopropylidene malonic ester by way of lavandylic acid. In the other process, lavandulol is made from methylheptenone and formaldehyde in a Prins reaction, followed by a methyl Grignard reaction and a pyrolysis.

Japanese Pat. No. 3011/1964, published Mar. 24, 1964, proposed that lavandulol be prepared by reaction of 2,6-dimethyl-2,5-heptadienyl acetate with potassium hydroxide in aqueous ethanol. The starting material can be obtained from 2,6-dimethyl-1,5-heptadiene, paraformaldehyde and acetic anhydride, heating them for 5 hours in an autoclave at 220°C.

Japanese Pat. No. 7756/1967, published May 18, 1967, prepared lavandulol by condensation of isopentenyl halides in the presence of an alkali metal or alkaline earth metal amide, followed by reduction with sodium aluminum hydride, thus obtaining an ester of lavandulic acid.

None of these methods is really suitable for large-scale commercial production of lavandulol at a reasonable cost. The process of the invention provides such a route, however, because of the availability of the starting materials, isoprene, isoprene hydrohalide and Mg, at low cost.

By substitution of appropriate conjugated dienes and allyl halides, it is possible to prepare other terpenic alcohols of complex structure, similar to or isomeric to lavandulol.

In the process of the invention, it is quite important that the reaction system be maintained anhydrous, and that the magnesium be reacted simultaneously with the conjugated diene and the allyl halide. If, for example, a Grignard reagent is prepared from the magnesium and allyl halide, and it is then attempted to react this Grignard reagent with a conjugated diene, the reaction of the invention does not occur. It appears, therefore, that reaction with the conjugated diene can take place only if both conjugated diene and allyl halide are present together during the formation of the Grignard reagent. Apparently, reactive intermediates or transition radical complexes are formed in the course of the preparation of the Grignard reagent of the invention, which can react with conjugated dienes only if they are present in the reaction mixture at the time of its formation.

The reaction in forming the Grignard reagent of the invention also has to be carried out at a high enough temperature to impart sufficient reactivity to the conjugated diene and/or the intermediate complex or radical. A temperature within the range from about 5°C to about 200°C is sufficient. On the other hand, it is necessary to avoid an excess of the allyl halide in the reaction mixture in the course of the reaction, because otherwise extensive coupling of the allyl halide with the magnesium may take place before the conjugated diene can react and become incorporated in the complex. The reaction of the allyl halide with magnesium is much faster than the reaction between diene and magnesium.

The reaction, consequently, is most conveniently carried out at or above the reflux temperature of the cyclic ether used as the solvent, with addition concurrently of conjugated diene and allyl halide. Thus, a mixture of the conjugated diene and allyl halide can be added together to the mixture of magnesium in the cyclic ether at reflux temperature. It is also possible to add the allyl halide to a mixture of conjugated diene and magnesium in cyclic ether, although this forms a considerable amount of higher molecular weight products.

The formation of the Grignard reagent requires stoichiometric amounts of the conjugated diene and allyl halide: one mole of each, per mole of magnesium. However, an excess of the conjugated diene can be used, to promote the reaction of the conjugated diene to form the Grignard reagent. This excess can be within the range from about two to about ten times the stoichiometric amount, preferably from about two to about three times the stoichiometric amount. Larger than stoichiometric amounts of magnesium can also be used, for instance, double or triple quantities, but no significant advantage is usually observed, although there may be a somewhat increased reaction rate. Since magnesium is expensive and the excess has to be recovered, the use of an excess of magnesium is normally not desirable, in a commercial process.

The cyclic ether provides the reaction medium in which the reaction takes place, and also permits control of reaction temperature at the pressure used. The higher the reaction temperature, the higher the reaction rate, and it is therefore frequently desirable to carry out the reaction in a closed vessel under pressure.

In general, the amount of cyclic ether is within the range from about 50 to about 1,000 ml per mole of conjugated diene and allyl halide. The preferred amount is within the range from about 150 to about 500 ml.

The magnesium is initially dispersed or suspended in the reaction mixture, and a uniform heterogeneous mixture is maintained by mechanical stirring. As the reaction proceeds, the magnesium dissolves. Consequently, if the amount of magnesium is stoichiometric, the completion of the reaction is indicated by the complete or almost complete dissolution of the magnesium. If an excess of magnesium is used, the reaction is complete when no more magnesium dissolves.

After formation of the Grignard reagent, the reaction mixture can be cooled to room temperature or below, and can then be stored until needed, while maintaining it anhydrous.

Hydrolysis of the Grignard reagent of the invention with water or acid permits recovery of the condensation product of the conjugated diene and allyl halide in the form of non-conjugated diene hydrocarbons:

(VI)

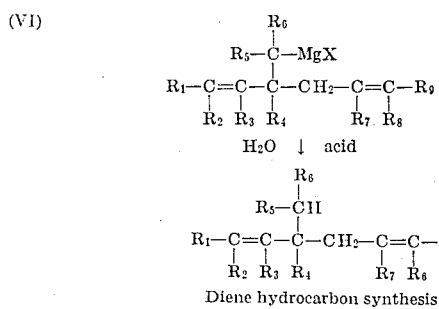

Diene hydrocarbon synthesis

Oxygenation of the Grignard reagent of the invention, by reaction with molecular oxygen followed by hydrolysis with an acid or water, results in the isolation of the corresponding alcohol as shown in schemes II and III, above, the alcohol being substituted at the position previously held by the MgX of the Grignard reagent.

Oxygenation of the Grignard reagent of the invention can be carried out by permitting an equivalent amount of oxygen to react therewith at room temperature, or at an elevated temperature. Temperatures within the range from about 5°C. to about 150°C. can be used. The oxygen can be introduced as pure oxygen gas, or in admixture with other gases, inert to the Grignard reagent, such as, for example, nitrogen. Air can also be used, and is usually the cheapest and most available source. Pure oxygen, however, may provide a more rapid oxidation reaction.

The Grignard reagent can also be reacted with compounds reactive with Grignard reagent in conventional Grignard syntheses, such as: carbon dioxide, to form the corresponding acid; dialkyl formamide or a nitrile to form the corresponding aldehyde or ketone; formaldehyde or a higher aldehyde, a ketone, or an alkylene oxide, to form a higher alcohol; cyclic acid anhydride to form a γ-keto acid (the resulting product is recovered using conventional techniques); according to the following reactions:

(VIII)

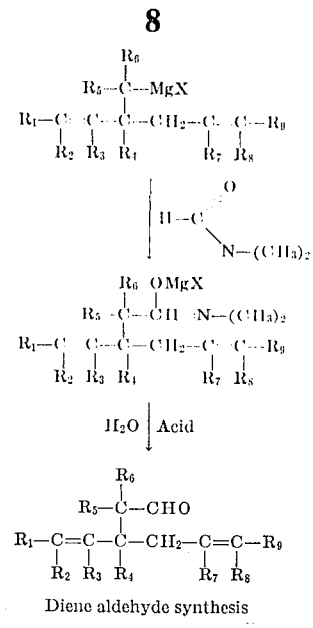

Diene aldehyde synthesis (IX)

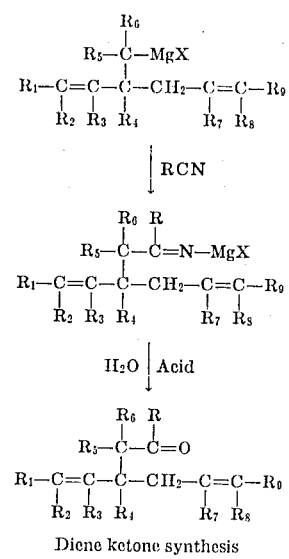

Diene ketone synthesis (X)

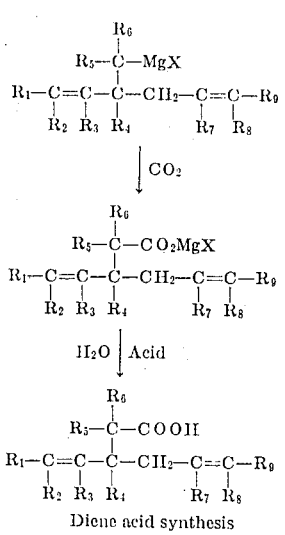

Diene acid synthesis

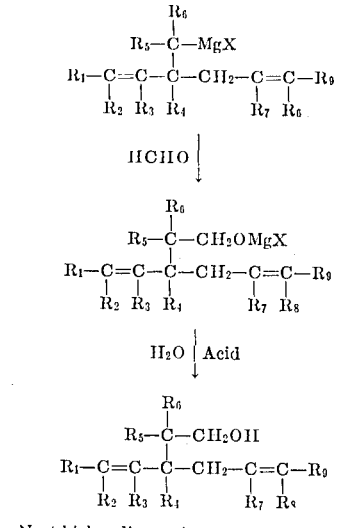

Next higher diene primary alcohol synthesis (XI)

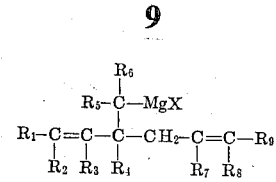

↓ RCHO

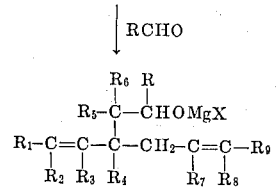

↓ H₂O | Acid

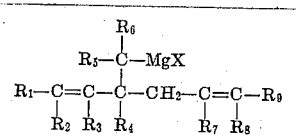

Higher diene secondary alcohol synthesis (XII)

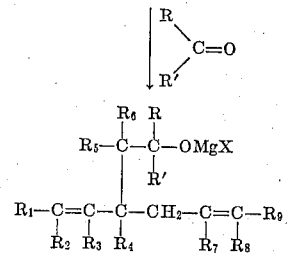

↓ H₂O | Acid

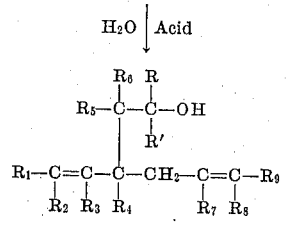

Higher diene tertiary alcohol synthesis

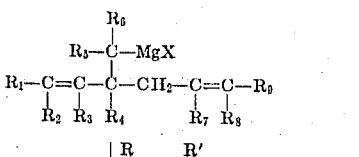

R and R' are H or organic group

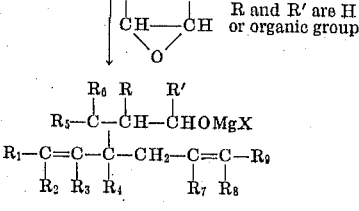

↓ H₂O | Acid

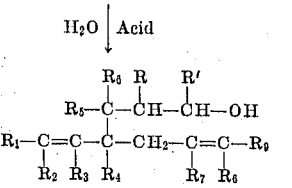

Two CH₂ higher diene primary or secondary alcohol synthesis (XIV)

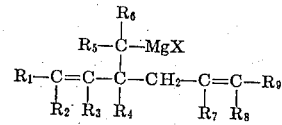

↓ 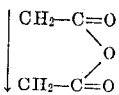

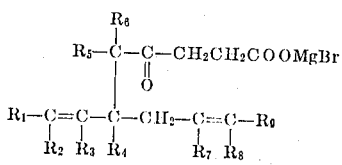

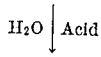

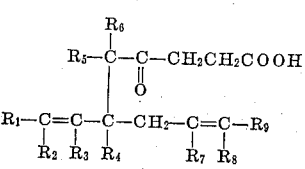

Diene γ-keto acid synthesis

These are conventional reactions of Grignard reagents, and are carried out under the usual conditions, in the solvent solution in which the Grignard reagent of the invention is formed.

The following Examples in the opinion of the inventor represent preferred embodiments of the invention:

EXAMPLE 1

A mixture of isoprene hydrochloride (0.5 mole) and isoprene (0.5 mole) in 300 ml of tetrahydrofuran was added slowly to 0.5 gram atom of magnesium turnings, with rapid stirring, under a nitrogen blanket. The magnesium had been treated with 1 ml of ethyl bromide in 3 ml of tetrahydrofuran and allowed to stand until heat was evolved, indicating the activation of the magnesium. During the addition of the mix, the reaction was maintained at reflux by external heating. The addition was carried out slowly enough to keep the temperature of the refluxing mixture above 65°C. (mainly at 71°-72°C.). The addition took 29½ hours. A deep black solution resulted, and the magnesium was consumed completely. This showed that Wurtz coupling or di isoprene magnesium formation did not occur to any significant extent, since then the magnesium would not have been consumed.

The reaction mixture was cooled to 27°C. One-fifth of the nitrogen gas blanket was replaced with pure oxygen, and the system was connected to a reservoir of oxygen in such a way that oxygen above the mixture would be replaced as rapidly as it was used. When the stirrer was turned on, the oxygen was absorbed rapidly, and the temperature rose to 30°C. It was maintained at 30°C. or below by use of a cooling bath. In 3 hours, 15 minutes a total of 5.2 liters (atm pr) of oxygen was absorbed and the absorption stopped. The heat evolution also abruptly ceased. The oxygen absorption corresponded to 85.5% of theory, for 0.5 mole of organomagnesium chloride.

The mixture was quenched by adding to 1.5 liters of water and 60 grams of acetic acid to dissolve basic magnesium salts. An oil which formed was separated. The water was extracted three times with 150 ml portions of petroleum ether, and the oil and extracts were combined. They were washed three times with 300 ml portions of water to remove acid, magnesium salts, and some tetrahydrofuran. Solvents were stripped off and the residue vacuum distilled to yield 43 grams of product boiling from 50° to 70°C. at 1 mm pressure 3.5 grams up to 95°C. (2 mm), 11 grams up to 135°C. (2 mm), 2.5 grams up to 155°C. (2 mm) and a residue of 5 grams. The $C_{10}$ alcohol fraction (that boiling up to 70°C.) was analyzed by gas chromatography through a 10-ft. 10% Carbowax column. The major component of the $C_{10}$ alcohols was lavandulol, with three other major components, and several minor components. No peak corresponding to linalool or geraniol was found.

In order to determine whether isoprene reacts with isoprene magnesium hydrochloride previously prepared, the following experiments were run:

a. Isoprene hydrochloride (3,3-dimethylallyl chloride), 0.5 mole in 300 ml of tetrahydrofuran, was added to 0.5 gram-atom of magnesium turnings (activated) with good stirring, at a temperature of 25° over a period of 2 hours, followed by agitation for 4 hours. Titration indicated that a 60% yield of isoprene magnesium hydrochloride Grignard resulted. Then 0.5 mole of isoprene was added and the mixture was stirred for 20 hours. Then the reaction was oxidized; the consumption of oxygen was equal to a 60% yield of Grignard. Work-up yielded low boilers including prenyl alcohol (methyl butenol) but no $C_{10}$ terpene alcohols. No reaction to form the Grignard reagent of the invention had occurred.

b. The Grignard as detailed in (a) was prepared and decanted off from unreacted magnesium. This was to prevent the known reaction of isoprene with magnesium. To the Grignard (titrated at a 60% yield) was slowly added 0.5 mole isoprene at the reflux temperature. The temperature went from 70.5°C. to 61°C. as the low boiling isoprene was added. The mixture was allowed to reflux for 24 hours. It was cooled, oxidized and worked up. Again no $C_{10}$ terpene alcohols resulted. Thus, again, reaction to form the Grignard reagent of the invention did not occur.

EXAMPLES 2 TO 4

Several runs identical to Example 1 were carried out but at various temperatures.

TABLE I

| Example | Temperature of Reaction | Hydrocarbons | Yield of $C_{10}$ Alcohols | $C_{15}$ Alcohols |
|---|---|---|---|---|
| 2 | 71-72 | 6.5 g | 43+ g | 14.5 g |
| 3 | 30 | 20 g * | 5.5 g | 5 g |
| 4 | 50 | 45 g * | 9 g | 9 g |

*Contains methylbutenol from dimethylallylmagnesium chloride.

Thus, at 30°C. and 50°C., some reaction occurs to form the isoprene-isoprene magnesium hydrochloride Grignard reagent of the invention, but the reaction proceeds primarily towards the formation of isoprene magnesium hydrochloride or a Wurtz coupling of the isoprene hydrochloride. Although lower temperatures are operable, reflux or higher temperatures are preferable for a good yield.

EXAMPLE 5

Example 1 was repeated, but 150 ml of tetrahydrofuran was used instead of 300 ml. Reaction proceeded at the high reflux temperature of 70° to 81.5°C. over a period of 11 hours, 40 minutes. The solution was not viscous and there was very little magnesium left unconsumed. Oxidation consumed 90% of the theoretical oxygen. The $C_{10}$ alcohol fraction amounted to 41 g with 14.5 g of a $C_{15}$ fraction and 5.5 g of residue. Thus, the yield was as good as that of Example 1 with a decrease of reaction time from 29½ hours to less than 12 hours.

EXAMPLE 6

By the procedure of Example 1, using 200 ml of tetrahydrofuran with one mole of isoprene hydrochloride and one gram-atom of magnesium turnings (double the molar quantities of Example 1, except for the tetrahydrofuran), formation of the Grignard reagent of the invention was completed in 14 hours at a reflux temperature of 90° to 94°C. During oxidation, the viscosity of the mix increased. The yield was 15 g of $C_{10}$ lower boilers, 78 g of $C_{10}$ alcohols, 29.5 g of a $C_{15}$ alcohol fraction and a distillation residue of 13 g.

EXAMPLE 7

To 182.5 g (7.5 gram-atoms) of magnesium turnings, activated by 5 ml of ethyl bromide in 50 ml of tetrahydrofuran, was added dropwise a mixture of isoprene 510 g (7.5 moles), isoprene hydrochloride, 787.5 g (7.5 moles) and tetrahydrofuran, 1,500 ml. The mix was added with good agitation of the magnesium and with external heat applied to keep the temperature of reaction high. At the early stages, first 200 ml of mix, it climbed slowly from 75°C. to 84°C. over a 2-hour period. Thereafter, it was maintained between 85° and 89°C., for the duration of the addition; a total time of 14 hours, 15 minutes being required.

Oxidation was by the procedure of Example 1. A total of 71.5 to 72 liters of oxygen was consumed. After the oxidation was complete, the reaction mass was quenched in 6 liters of water with 450 g of acetic acid added to dissolve the magnesium salts. The layers were separated, the water layer extracted three times with 300 ml of petroleum ether (b. 30°-60°C.), the organic layers were combined and the solvents boiled off.

The residue was distilled through a 5-plate Goodloe column under oil pump vacuum:

TABLE II

| Vacuum (mm pr) | Vapor T | Fraction |
|---|---|---|
| 5 mm | <40°C. | solvent + 36 g of hydrocarbon |
| 2 mm | 35°-40°C. | $C_{10}$ hydrocarbon fraction 85 g |
| 2 mm | 65°C. | $C_{10}$ hydro + $C_{10}$ alcohols 11 g |
| 2 mm | <120°C. | $C_{10}$ alcohols 584 g |

The column was removed and the residue was distilled directly to the condensing head to 185°C. vapor temperature. The $C_{15}$ alcohol ($C_{20}$ alcohol also) yield was 297.5 g, with a final distillation residue of 40.5 g.

Gas chromatographic analysis of the $C_{10}$ alcohol fraction, using a Carbowax column at 170°C., revealed four major compound peaks, I, II, III and IV with six or seven minor peaks. The major peaks accounted for substantially more than 90% of the $C_{10}$ alcohols, with peak IV alone accounting for about 55-60%.

The $C_{10}$ alcohols were vacuum fractionated in a 15-plate Goodloe column to obtain 19 fractions. Of these fractions, 10-14 were rich in peak IV, and they were combined and refractionated to yield 11 fractions, of which fractions 6-10 were very high in peak IV.

```
6 — 89.9% pk IV
8 — 96.5% pk IV
10 — 97.5% pk IV
```

Analyses of fraction 10 by nuclear magnetic resonance (proton), by infrared, and by gas chromatography of a known compound established that peak IV was actually lavandulol, an especially valuable terpene alcohol, found naturally in oil of lavender. The overall conversion of a sample to pure lavandulyl acetate confirmed lavandulol. The yield of lavandulol in this process was about 30%.

The remainder of the original 19 fractions were added to the residue of this fractionation and fractionally distilled through the 15-plate Goodloe column to yield pure peak I material, pure peak II material and enriched peak III material.

Peak I is a terpene alcohol of as yet unknown structure. It does not correspond to any naturally occurring material, as far as is known. Peak III is 2,5-dimethyl-2-vinyl-4-hexanol. This material results from a 1,2-addition of isoprene hydrochloride and magnesium to isoprene, while lavandulol results from a 3,4-addition. Peak II is difficult to define. It has a boiling point higher than IV; the order of increasing boiling points is I, III, IV and II. It is a single well defined peak on Carbowax; however, Peak II gas chromatographed on an SE-30 (silicone) column under identical conditions splits into four peaks. Thus "Peak II" is actually composed of four separate compounds which have identical retention times on Carbowax. Peaks I, III, and IV do not split, since they correspond to distinct compounds.

EXAMPLE 8

A one-mole run was made by the procedure of Example 1, but substituting allyl chloride for isoprene hydrochloride. A total yield of 72% of theory of alcohols boiling above allyl alcohol was obtained. Considerable allyl alcohol also was obtained, but not recovered. Of the higher alcohols, about 75% were in the range of $C_8$'s while the remainder were $C_{13}$ alcohols and above. Gas chromatography of the fractions showed of the $C_8$'s six peaks with three of these being major peaks and one accounting for 69.5% of the $C_{10}$ alcohols. Its position corresponds to the position of lavandulol in the $C_{10}$ alcohols, although its structure is not yet known. The $C_{13}$ alcohols displayed at least 12 defined peaks, with some other trace peaks poorly defined.

EXAMPLE 9

Use of methallyl chloride in place of the isoprene hydrochloride in the Grignard preparation of Example 1 gave some incorporation of isoprene and methallyl radicals. Oxidation of the Grignard with a stream of dry air, free of $CO_2$, yielded a small amount of material distilling in the range of $C_9$ and $C_{14}$ alcohols (about 12% of theory).

EXAMPLE 10

In the procedure of Example 1, ethyl bromide (1.0 mole) was substituted for the 1.0 mole of isoprene hydrochloride. Instead of oxidizing the mixture, it was allowed to react with paraformaldehyde (1.1 mole). The workup was as in Example 1. The organic solution solvent was stripped on a small column and distillation under vacuum yielded 3 fractions:

TABLE III

| Fraction | Vapor T. | Amount |
| --- | --- | --- |
| No. 1 at 35 mm | 62°-77°C. | 13.6 g |
| No. 2 at 0.2-0.35 mm | 40°-75°C. | 17.6 g |
| No. 3 at 0.3 mm | 85°-101°C. | 2.1 g |
| | | 10.8 g |

GLC analysis of the fractions showed six peaks in the $C_8$ range for No. 1 with three of these peaks accounting for about 80-85% of the fraction. Fraction No. 2 showed the same six peaks for $C_8$ with only one predominating and six peaks in the $C_{13}$ range with one peak predominating. Fraction No. 3 had similarly small amounts of the $C_8$ peaks and the $C_{13}$ peaks and six peaks at a higher retention time.

Therefore, it is obvious that during formation of ethylmagnesium bromide, isoprene can be incorporated into the reagent.

EXAMPLE 11

When the process of Example 1 was carried out with 1.0 mole of piperylene replacing the 1.0 mole of isoprene, a reagent was obtained (solids insoluble in the solvent) which consumed only 4.2 liters of oxygen (about ⅓ the theoretical quantity). After workup and distillation of the organic residue, three fractions were obtained:

1. prenyl alcohol (from the dimethylallyl Grignard) - 29.6 g
2. material boiling 58-100 (15 mm) - 10.3 g
3. material boiling 92-130 (1.0 mm) - 10.5 g The last fraction contained alcohols in the $C_{10}$ range. Hence, piperylene entered into the reaction to give low yields of products.

EXAMPLES 12 TO 18

Using the procedure and other conditions of Example 1, a series of runs were made at various isoprene:isoprene hydrochloride:Mg ratios to determine the effect of the ratio on total yield, on relative yields of $C_{10}/C_{15}$ alcohols, and on yield of lavandulol.

TABLE IV

| Run | Ratios (2) Isoprene/ISHCl/Mg | $C_{10}$ Alcohol (g) | $C_{15}$ Alcohol (g) | % Lavandulol Yield* |
| --- | --- | --- | --- | --- |
| 12 | 0.5/1.0/1.0 | 52.3 | 8.1 | 19.1 |
| 13 | 0.5/1.0/2.0 | 63.2 | 5.1 | 24.5 |
| 14 | 0.75/1.0/1.0 | 57.2 | 23.8 | 20.3 |
| 15 | 0.75/1.0/2.0 | 75.0 | 11.4 | 28.4 |
| 16 | 1.0/1.0/2.0 | 75.7 | 14.6 | 27.5 |
| 17 | 2.0/1.0/1.0 | 84.4 | 52.8 | 31.6 |
| 18 | 2.0/1.0/2.0 | 95.0 | 78.4 | 34.2 |

*Based on isoprene hydrochloride
(2) — 200 ml of tetrahydrofuran solvent used

EXAMPLE 19

The procedure of Example 1 was used, substituting crotonyl chloride for the isoprene hydrochloride. The following results were obtained:

TABLE V

| Low Boiling Peaks (%) | Intermediate Peaks(%) | High Boiling Peaks (%) |
|---|---|---|
| 2 VS, 1S | 2S (1.8 (2.1 2M 4.1,8.4 1VL 43 Overall 60% | |

* S is small; VS is very small; M is medium; L is large; VL is very large, in referring to the heights of the GLC peaks.

Particularly notable is the occurrence of one major peak, which indicates that the free radical or carbanion intermediate is strongly sterically directed.

EXAMPLE 20

Isoprene (1 mole, 68 g) and 3-chloro-2-methylpropene (1 mole, 90.5 g) in 200 ml tetrahydrofuran was added dropwise, to activated magnesium (70-80 mesh powder, 1 mole, 24.3 g). The stirred mixture was kept at 80°-85°C., by external heating during the 4½-hour addition. Upon completion of the addition, the mixture was heated at 85°C. for an additional hour. The reaction was run under nitrogen.

The Grignard was oxidized by a 20% oxygen, 80% nitrogen gas mixture, requiring two hours at 30°-40°C.

Gas chromatography of the final product showed 5 $C_9$ alcohol peaks, representing a total yield of 57.8%. The two main $C_9$ alcohol products were produced in 44.4% and 8.6% yields.

EXAMPLE 21

The Grignard reagent resulting from the reaction of a mixture of isoprene and isoprene hydrochloride over magnesium as described in Example 1 was treated with the reactive reagents given below:

TABLE VI

| Reagent | Low Boiler Peaks | Product Range Peaks | Product Overall Yield | High Boiler Peaks |
|---|---|---|---|---|
| Formaldehyde | 3VS, 4S, 2M | 5VS (2.5%) 1M (4.5%) 1VL (46.7%) | 53.7% | 2VS, 2S, 3M |
| Acetaldehyde | 2VS, 1S, 3M | 4VS (3.9) 3S (5.2,3.1, 1.5) | 57.0% | 3VS, 3S, 2M |
| Propylene Oxide | 3VS, 2M, 1L | 2VS (2.2) 2S (2.5,2.2) 1L (20.2) | 27.0% | 2S, 1L |
| Acetone | 2VS, 3S | 3VS (2.0) 3S (6.6,5.5, 3.7) | 32.8% | 8VS, 2S, 1M |

* VS = very small; S = small; M = medium; L = large; VL = very large, referring to sizes of GLC peaks.

Having regard to the foregoing disclosure, the following is claimed as the inventive and patentable embodiments thereof:

1. A process for preparing a Grignard reagent which comprises reacting a conjugated diene and an alkyl halide together with magnesium metal in an organic ether solvent under anhydrous conditions at a temperature within the range from about 5° to about 200°C., at a molar ratio of conjugated diene:allyl halide:magnesium within the range from about 0.5:1:1 to about 10:1:3, the allyl halide having the formula:

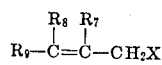

and the conjugated diene having the formula:

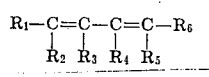

wherein $R_1$, $R_2$, $R_3$, $R_4$, $R_5$, $R_6$, $R_7$, $R_8$ and $R_9$ are selected from the group consisting of hydrogen and hydrocarbon groups having from one to about 50 carbon atoms, and X is selected from the group consisting of chloride, bromide and iodide.

2. A process according to claim 1, in which the allyl halide is chloride.

3. A process according to claim 1, in which the hydrocarbon groups are selected from the group consisting of alkyl, alkenyl, aryl, cycloalkyl, cycloalkenyl, alkylaryl, arylalkyl, cycloalkylalkyl and alkylcycloalkyl groups.

4. A process according to claim 1, in which the Grignard reagent has the formula

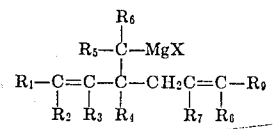

5. A process according to claim 4, in which the conjugated diene is isoprene and the allyl halide is prenyl chloride.

6. A process according to claim 1, in which the organic ether solvent is selected from the group consisting of aliphatic and cyclic ethers.

7. A process according to claim 1, in which the cyclic ether is tetrahydrofuran.

8. A process according to claim 1, in which the magnesium is reacted simultaneously with the conjugated diene and the allyl halide.

9. A process according to claim 8, in which the allyl halide and conjugated diene are added together to the magnesium and organic ether solvent.

10. A process according to claim 1, in which the allyl halide is added to a mixture of conjugated diene and magnesium in the organic ether solvent.

11. A process according to claim 1, in which the reaction is carried out at the reflux temperature of the organic ether used as the solvent, with addition concurrently of conjugated diene and allyl halide.

12. A process according to claim 1, in which the amount of organic ether is within the range from about 50 to about 1,000 ml per mole of conjugated diene and allyl halide.

* * * * *

UNITED STATES PATENT OFFICE
CERTIFICATE OF CORRECTION

Patent No. 3,856,867　　　　　　　　　　Dated December 24, 1974

Inventor(s) Hugh E. Ramsden　　　　　　　Page 1 of 3

It is certified that error appears in the above-identified patent and that said Letters Patent are hereby corrected as shown below:

Column 3, line 15, "Griguard" should read -- Grignard --.
Column 7, lines 1 to 10, formula (VI) should appear as shown below:

VI.

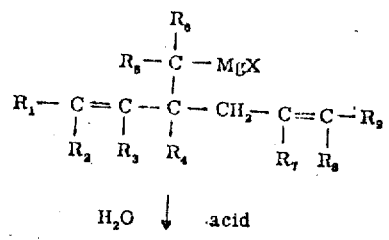

$H_2O \downarrow$ acid

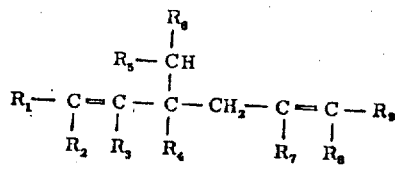

Diene hydrocarbon synthesis

UNITED STATES PATENT OFFICE
CERTIFICATE OF CORRECTION

Patent No. 3,856,867                     Dated December 24, 1974

Inventor(s) Hugh E. Ramsden

It is certified that error appears in the above-identified patent and that said Letters Patent are hereby corrected as shown below:

Column 8, lines 1 to 23, formula (VIII) should appear as shown below:

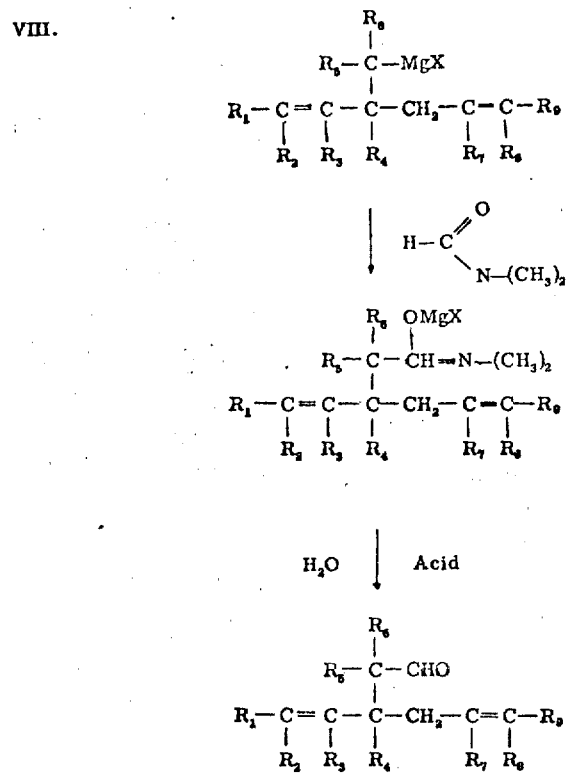

Diene aldehyde synthesis

UNITED STATES PATENT OFFICE
CERTIFICATE OF CORRECTION

Patent No. 3,856,867   Dated December 24, 1974

Inventor(s)   Hugh E. Ramsden   Page 3 of 3

It is certified that error appears in the above-identified patent and that said Letters Patent are hereby corrected as shown below:

Column 15, claim 1, line 48, "alkyl" should read -- allyl --.
Column 16, claim 2, line 45, before "chloride" insert
-- prenyl --.  Column 16, claim 4, the formula should appear as shown below:

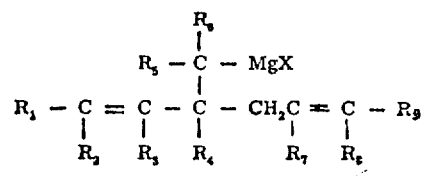

Signed and Sealed this

*twenty-third* Day of *March 1976*

[SEAL]

Attest:

RUTH C. MASON
*Attesting Officer*

C. MARSHALL DANN
*Commissioner of Patents and Trademarks*